US010325613B1

(12) United States Patent
Lionais

(10) Patent No.: US 10,325,613 B1
(45) Date of Patent: Jun. 18, 2019

(54) ACOUSTIC DELAY ESTIMATION

(71) Applicant: Microsemi Semiconductor ULC, Kanata (CA)

(72) Inventor: Patrick Xavier Lionais, Ottawa (CA)

(73) Assignee: Microsemi Semiconductor ULC, Kanata (CA)

( * ) Notice: Subject to any disclaimer, the term of this patent is extended or adjusted under 35 U.S.C. 154(b) by 0 days.

(21) Appl. No.: 16/155,280

(22) Filed: Oct. 9, 2018

Related U.S. Application Data

(60) Provisional application No. 62/696,861, filed on Jul. 12, 2018.

(51) Int. Cl.

| | |
|---|---|
| ***H04B 3/20*** | (2006.01) |
| ***H04L 12/64*** | (2006.01) |
| ***G10L 21/0232*** | (2013.01) |
| ***H04R 29/00*** | (2006.01) |
| ***H04R 3/04*** | (2006.01) |
| *G10L 21/0208* | (2013.01) |

(52) U.S. Cl.
CPC ............ *G10L 21/0232* (2013.01); *H04R 3/04* (2013.01); *H04R 29/00* (2013.01); *G10L 2021/02082* (2013.01)

(58) Field of Classification Search
CPC . G10L 21/0264; G10L 21/0208; G10L 25/48; G10L 2021/02082; H04R 3/04; H04B 3/20; H04B 3/23; H04B 7/015; H04L 2012/6491; H04M 9/082
USPC ....... 381/66, 300, 301, 302, 303, 71.1, 71.2, 381/71.3, 71.4, 94.1, 94.3; 370/286, 289
See application file for complete search history.

(56) References Cited

U.S. PATENT DOCUMENTS

| | | | | |
|---|---|---|---|---|
| 5,610,909 A * | 3/1997 | Shaw | .................... | H04M 9/082 370/291 |
| 9,947,337 B1 * | 4/2018 | Wang | ........................ | H04R 3/02 |
| 2010/0215185 A1 * | 8/2010 | Christoph | ................ | H04B 3/21 381/71.1 |

* cited by examiner

*Primary Examiner* — Paul Kim
*Assistant Examiner* — Ubachukwu A Odunukwe
(74) *Attorney, Agent, or Firm* — Glass and Associates; Kenneth Glass

(57) ABSTRACT

An acoustic signal delay measurement apparatus constituted of: an acoustic signal input terminal; an acoustic signal output terminal; at least one echo input terminal; an adjustable tapped delay line exhibiting a plurality of taps, a first end of the tapped delay line coupled to the acoustic signal input terminal, each of the taps exhibiting a respective predetermined delay; a processor, an output of the processor coupled to a control input of the adjustable tapped delay line; and a plurality of adaptive filters, a first input of each of the plurality of adaptive filters coupled to a respective one of the at least one echo input terminal, a second input of each of the plurality of adaptive filters coupled to a respective one of the plurality of taps and an output of each of the plurality of adaptive filters coupled to a respective input of the processor, wherein the processor is arranged to determine a system delay responsive to: the amount of time it takes for one of the plurality of adaptive filters to converge; and the delay of the tap associated with the converged adaptive filter.

9 Claims, 5 Drawing Sheets

ACOUSTIC DELAY ESTIMATION

TECHNICAL FIELD

The present invention relates to the field of acoustics, and in particular to a method and apparatus for determining the inherent acoustic delay or audio latency in an audio system.

BACKGROUND

It is often desirable to measure the time delay of a signal through an audio system. For example, it may be necessary to measure the difference in time delay as an audio signal passes through each of a plurality of speakers compared to a reference audio signal when trying to ensure synchronization between the speakers. Traditionally, time delay measurement techniques in an audio system involve using a known impulse signal. One method involves performing a cross-correlation between a transmitted impulse signal and the recorded audio signal. This method involves a training period while the adaptive algorithm adapts to the audio characteristics of the room, and requires calibration tones or known reference tones. Other methods include use of time-domain reflectometry where a pulse or a short sine wave burst is transmitted from the audio system. Measurements are then made of the timing of the return echo. These methods are susceptible to ambient noise and multi-modal reverberation and/or echo in a room. As a result, the recorded audio signal or return echo signal is not an exact replica of the original transmitted signal.

Also, adaptive filters are used for echo cancellation. In certain applications, such as in the case of TV set top boxes, the echo is delayed by an amount of time that exceeds the capacity of the adaptive filter. Increasing the filter size is not practical for digital signal processing reasons.

SUMMARY OF THE INVENTION

Accordingly, it is a principal object of the present invention to overcome at least some of the disadvantages of prior art acoustic signal delay measurement techniques. This is provided in one embodiment by an acoustic signal delay measurement apparatus comprising: an acoustic signal input terminal; an acoustic signal output terminal; at least one echo input terminal; an adjustable tapped delay line exhibiting a plurality of taps, a first end of the tapped delay line coupled to the acoustic signal input terminal, each of the taps exhibiting a respective predetermined delay; a processor, an output of the processor coupled to a control input of the adjustable tapped delay line; and a plurality of adaptive filters, a first input of each of the plurality of adaptive filters coupled to a respective one of the at least one echo input terminal, a second input of each of the plurality of adaptive filters coupled to a respective one of the plurality of taps and an output of each of the plurality of adaptive filters coupled to a respective input of the processor, wherein the processor is arranged to determine a system delay responsive to: the amount of time it takes for one of the plurality of adaptive filters to converge; and the delay of the tap associated with the converged adaptive filter.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Figure 1A:
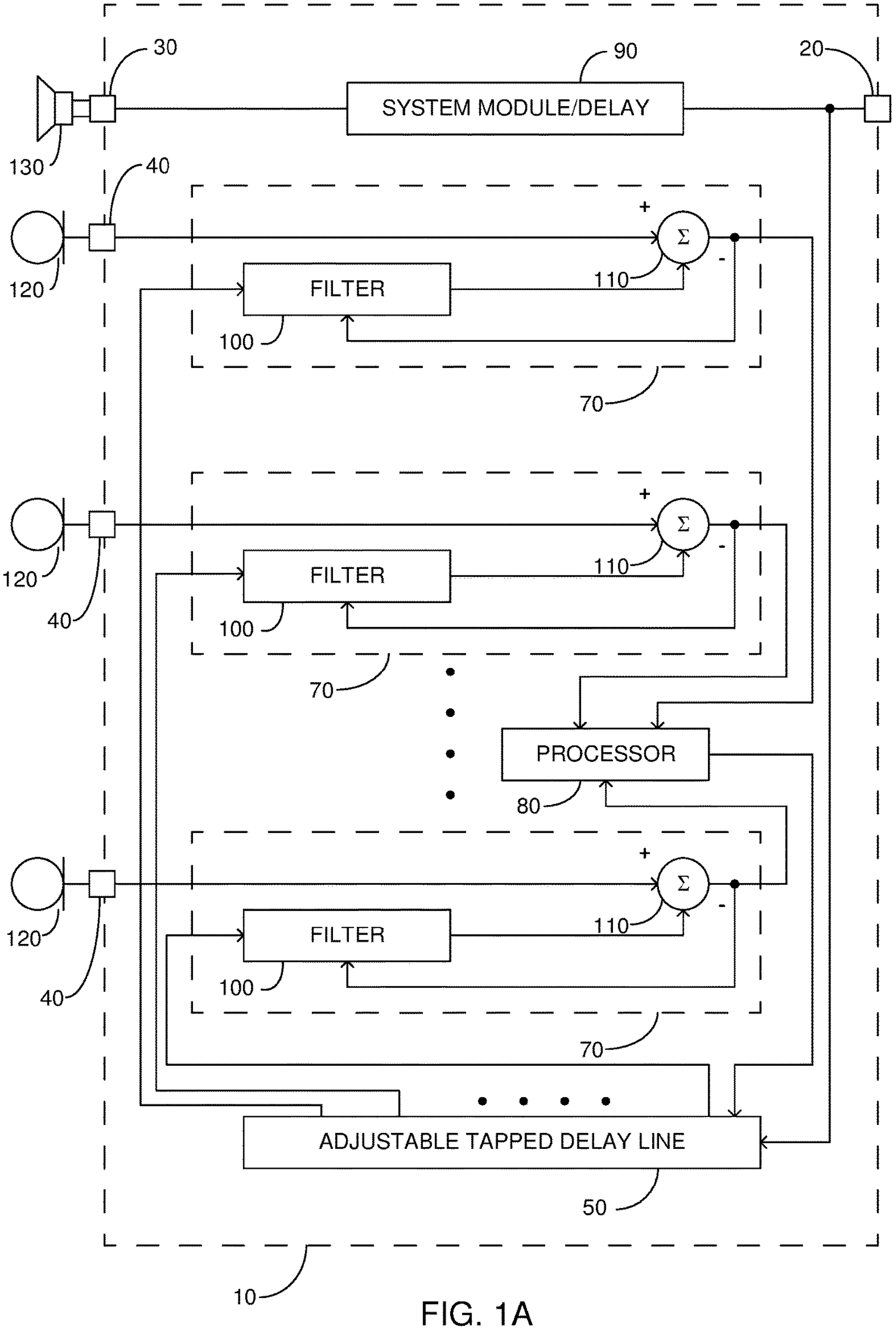
FIG. 1A illustrates a high level schematic diagram of a first embodiment of an acoustic signal delay measurement apparatus.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1A illustrates a high level schematic diagram of an acoustic signal delay measurement apparatus 10. Acoustic signal delay measurement apparatus 10 comprises: an acoustic signal input terminal 20; an acoustic signal output terminal 30; a plurality of echo input terminals 40; an adjustable tapped delay line 50 comprising a plurality of taps; a plurality of adaptive filters 70; a processor 80; and a system module 90. Each adaptive filter 70 comprises: a digital filter 100; and an adder 110. In one embodiment, digital filter 100 comprises a least mean squares (LMS) filter. Acoustic signal delay measurement apparatus 10 is illustrated in an embodiment where the number of echo input terminals 40 is the same as the number of adaptive filters 70, however this is not meant to be limiting in any way. In another embodiment, the number of echo input terminals 40 is less than the number of adaptive filters 70. System module 90 comprises various circuitry and software functionalities and represents the system delay.

Acoustic signal input terminal 20 is coupled to an input of system module 90 and a first end of adjustable tapped delay line 50. Each tap of adjustable tapped delay line 50 is coupled to a first input of a respective adaptive filter 70, the first input of each adaptive filter 70 representing a first input of the respective digital filter 100. A second input of each adaptive filter 70 is coupled to a respective echo input terminal 40, the second input of each adaptive filter 70 representing a first input of the respective adder 110. In the embodiment, as illustrated in relation to acoustic signal delay measurement apparatus 200 of FIG. 2, where the number of echo input terminals 40 is less than the number of adaptive filters 70, a plurality of adaptive filters 70 are coupled to a single echo input terminal 40, as will be described further below. Each echo input terminal 40 is arranged to receive a digitized acoustic signal received at a respective microphone 120. An output of each digital filter 100 is coupled to a second input of the respective adder 110. An output of each adder 110 is coupled to a control input of the respective digital filter 100 and to a respective input of processor 80. An output of processor 80 is coupled to a control input of adjustable tapped delay line 50. An output of system module 90 is coupled to acoustic signal output terminal 30 and acoustic signal output terminal 30 is further coupled to a speaker 130.

Figure 1B:
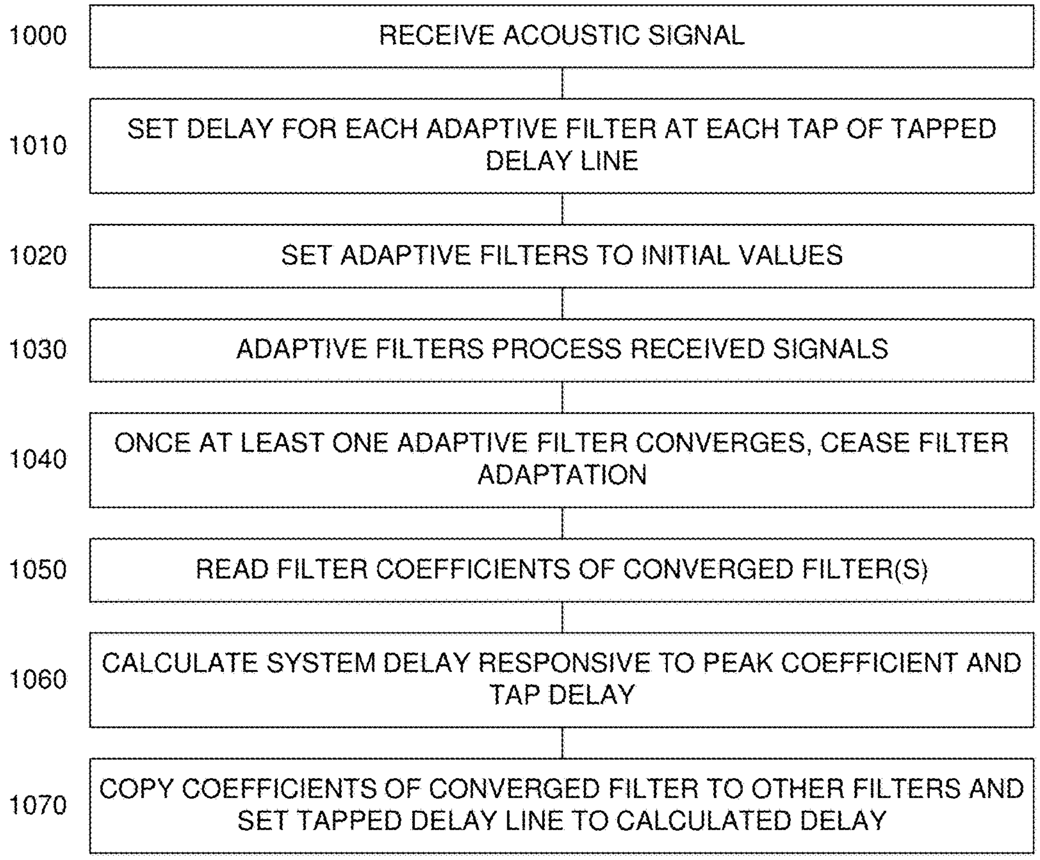
FIG. 1B illustrates a high level flow chart of a method of operation of the apparatus of FIG. 1A.

The operation of acoustic signal delay measurement apparatus 10 is described in relation to the high level flow chart of FIG. 1B. In stage 1000, a digitized acoustic signal is received at acoustic signal input terminal 20. The received signal enters both system module 90 and adjustable tapped delay line 50. In stage 1010, processor 80 sets the delay at each tap of adjustable tapped delay line 50, i.e. the delay of the received signal experienced by each adaptive filter 70. In one embodiment, the delays are initially set to be integer multiples of a predetermined value. In one further embodiment, the delays between adjacent taps are generally equal. In another further embodiment, the delays are given as:

$$T_N = N*k*M \qquad \text{EQ. 1}$$

where N is an integer number, $T_N$ is the delay at tap N, k is a predetermined number below 1, and M is the time it takes to apply all the taps of a digital filter 100 to a received signal. Preferably, k is between 0.5-0.75.

In stage 1020, the coefficients of digital filter 100 of each adaptive filter 70 are set to initial predetermined values. In one embodiment, all the coefficients are set to zero. In another embodiment, the coefficients are set to previously stored values from a previous delay estimation.

In stage 1030, each adaptive filter 70 begins processing the received signals. Particularly, the acoustic signal received at acoustic signal input terminal 20, delayed by the delay of system module 90, is output by speaker 130 and the echo thereof is picked up by microphones 120. The echo is then sampled by an analog to digital (A/D) converter and the digitized signal is received at the first input of adder 110 of the respective adaptive filter 70. Additionally, the acoustic signal received at acoustic signal input terminal 20 is applied, before the delay of system module 90, to adjustable tapped delay line 50. Thus, digital filter 100 of each adaptive filter 70 receives the original acoustic signal after a respective predetermined delay, as described above. The difference between the output of each digital filter 100 and the received echo signal is output by the respective adder 110 to the control input of the respective digital filter 100. The coefficients of digital filter 100 are then adjusted until adaptive filter 70 converges, i.e. the difference at the output of adder 110 is below a predetermined threshold, as known to those skilled in the art at the time of the invention. Processor 80 analyzes the outputs of adders 110 to determine for each adaptive filter 70 whether it has converged or not.

In stage 1040, once at least one adaptive filter 70 converges, processor 80 controls each adaptive filter 70 to cease adaptation, i.e. to stop adjusting the coefficients of the respective digital filter 100. In stage 1050, processor 80 reads the filter coefficients of the converged adaptive filter 70, or plurality of adaptive filters if they converged at the same time.

In stage 1060, processor 80 determines the delay within system module 90 responsive to the filter coefficients of the converged adaptive filter 70. Particularly, processor 80 determines at which coefficient the respective digital filter 100 peaked, i.e. which coefficient has the highest value. In one embodiment, the filter coefficients are first smoothed by a predefined smoothing filter to remove any spikes in the coefficient values in order to correctly identify the point at which the filter peaked, as known to those skilled in the art at the time of the invention. The time interval from when the first coefficient of digital filter 100 is applied until the peak coefficient is applied is denoted TF. The acoustic signal delay is thus calculated as:

$$T_D = TF + T_N \qquad \text{EQ. 2}$$

where $T_N$ is the delay of the acoustic signal within adjustable tapped delay line 50 at the tap coupled to the converged adaptive filter 70.

Figure 1C:
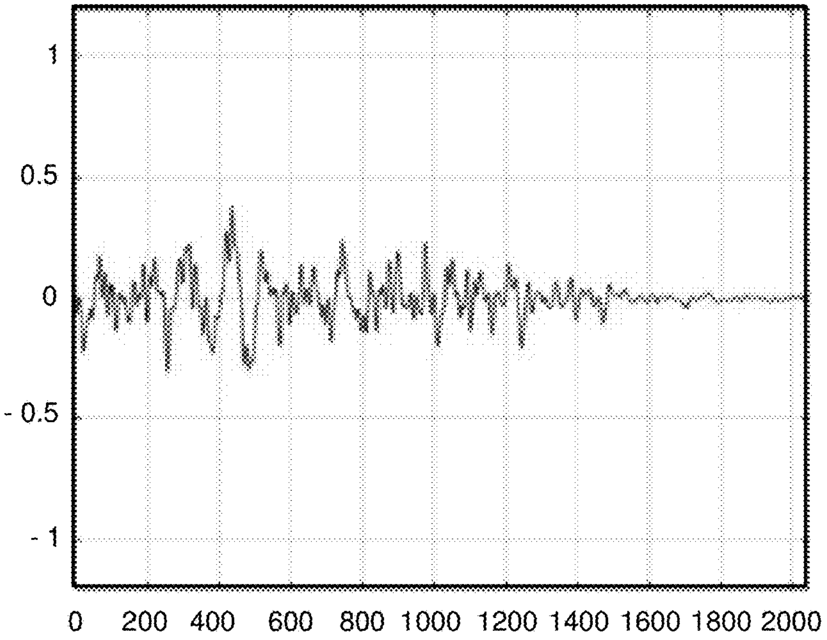
FIGS. 1C-1F illustrate various high level graphs showing an example of the apparatus of FIG. 1A.
Figure 1D:
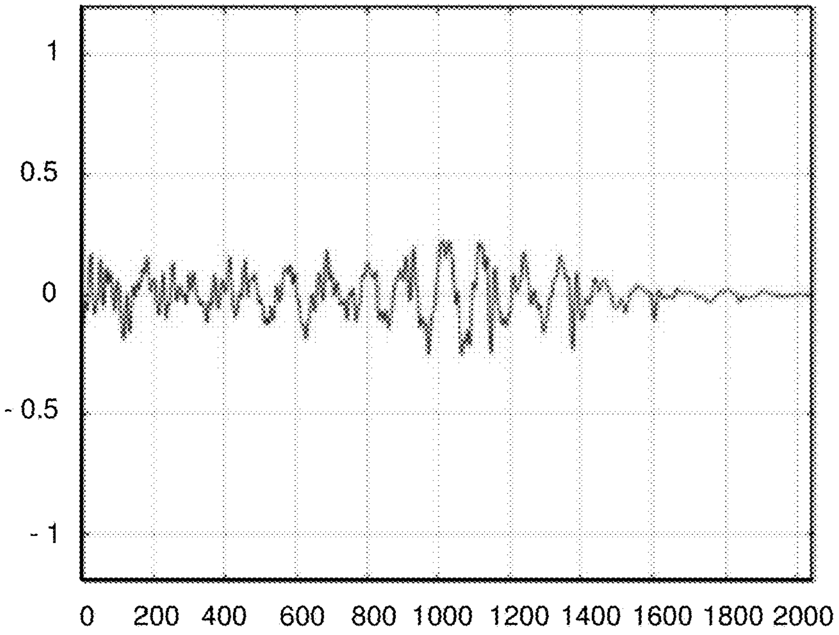
Figure 1E:
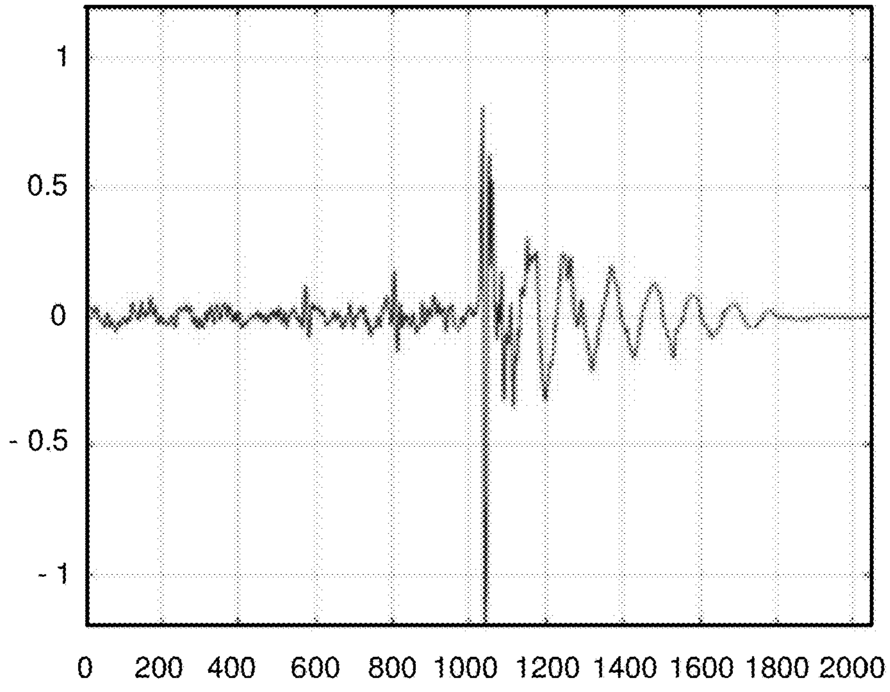
Figure 1F:
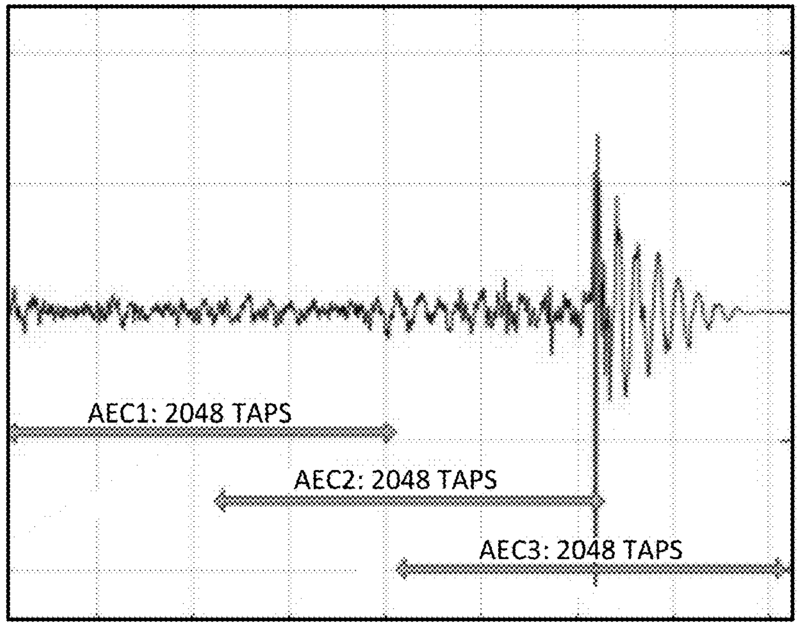

FIGS. 1C-1F illustrate an example where 3 adaptive filters 70 are provided. Digital filter 100 of each adaptive filter 70 comprises 2048 taps and k of EQ. 1 is equal to 0.5. The delay of system module 90 is 193 ms. Particularly, FIG. 1C illustrates a high level graph of the coefficients of digital filter 100 of the first adaptive filter 70, where no delay is provided from adjustable tapped delay line 50. FIG. 1D illustrates a high level graph of the coefficients of digital filter 100 of the second adaptive filter 70, where a delay of 1024 sampling times is provided by adjustable tapped delay line 50. FIG. 1E illustrates a high level graph of the coefficients of digital filter 100 of the third adaptive filter 70, where a delay of 2048 sampling times is provided by adjustable tapped delay line 50. FIG. 1F illustrates a high level graph comparing the operation times of each adaptive filter 70 with the operation of a theoretical 4096 tap filter for the 193 ms delayed acoustic signal. As illustrated, the third adaptive filter 70 converges quickly due to the short length of the filter and provides better convergence depth than the theoretical 4096 tap filter since there are fewer taps associated with the precursor, i.e. the period before the main impulse in the filter coefficients. Thus, an improved result is received while using a smaller filter.

In stage 1070, the filter coefficients of converged adaptive filter 70 are copied into the other adaptive filters 70. Additionally, the delay of each tap of adjustable tapped delay line 50 is set to the calculated delay of stage 1060, i.e. the delays for all of the adaptive filters 70 are now substantially identical. Thus, the delay of system module 90 is compensated for and adaptive filters 70 will cancel acoustic echo received at microphones 120 even with an internal delay greater than the size of adaptive filters 70.

Advantageously, the above described system and method allows for shorter adaptive filter lengths while still allowing for estimation and compensation for system delays longer than the length of the individual filters. After compensation, each adaptive filter will converge more quickly than if reset following system delay estimation. The above described method allows for an overall improvement in acoustic echo cancelling depth of convergence, while also allowing for greater tolerance to delay variation of acoustic echo path change before complete retraining, including overall system delay estimation, is required.

Additionally, the above described method can support multiple input channels, e.g. stereo, and multiple acoustic signal output terminals 30 since the delay is determined in relation to an internal tapped delay line.

Figure 2:
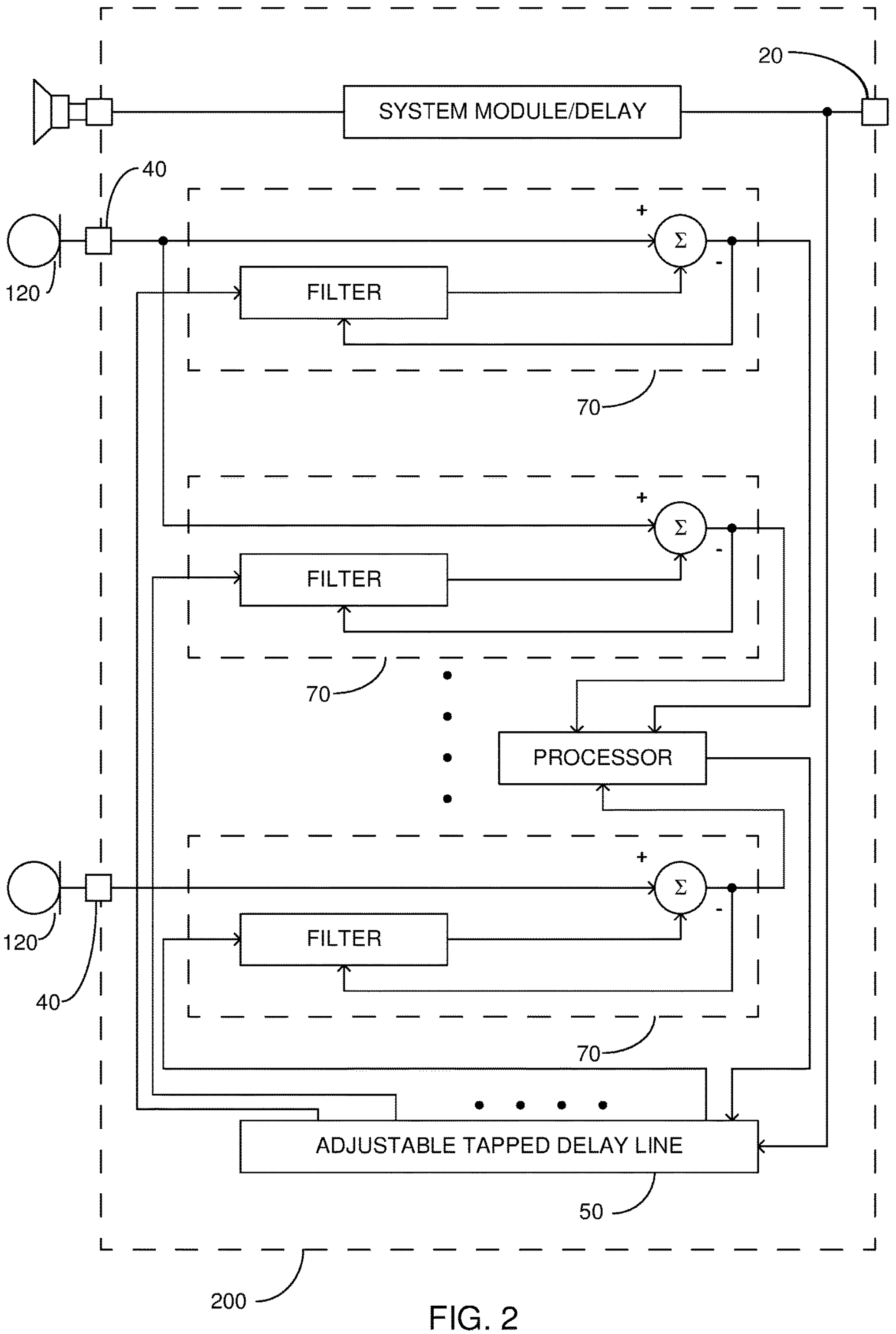
FIG. 2 illustrates a high level schematic diagram of a second embodiment of an acoustic signal delay measurement apparatus.

FIG. 2 illustrates a high level schematic diagram of an acoustic signal delay measurement apparatus 200. Acoustic signal delay measurement apparatus 200 is in all respects similar to acoustic signal delay measurement apparatus 10, with the exception that a least one of the echo input terminals 40 is coupled to a plurality of adaptive filters 70, i.e. a plurality of adaptive filters 70 is provided for at least one of the plurality of microphones 120. Alternatively (not shown), only a single microphone 120 is provided. The operation of acoustic signal delay measurement apparatus 200 is in all respects similar to acoustic signal delay measurement apparatus 10 and in the interest of brevity will not be repeated. Although several adaptive filters 70 receive the same echo input from the respective microphone 120, the delay applied by tapped delay line 50 for each adaptive filter 70 is different. Therefore, different delay possibilities can be checked using only a single echo input.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. An acoustic signal delay measurement apparatus comprising:

a signal input terminal;

a signal output terminal;

at least one echo input terminal;

an adjustable tapped delay line exhibiting a plurality of taps, a first end of said adjustable tapped delay line coupled to said signal input terminal, each of said taps exhibiting a respective predetermined delay in relation to the first end of said adjustable tapped delay line;

a processor, an output of said processor coupled to a control input of said adjustable tapped delay line; and a plurality of adaptive filters, a first input of each of said plurality of adaptive filters coupled to a respective one of said at least one echo input terminal, a second input of each of said plurality of adaptive filters coupled to a respective one of said plurality of taps and an output of each of said plurality of adaptive filters coupled to a respective input of said processor, wherein each of said plurality of adaptive filters exhibits a plurality of coefficients, and wherein said processor is arranged to determine a system delay responsive to:

an amount of time until achieving a peak value by one of said plurality of coefficients of one of said plurality of adaptive filters which has converged; and the predetermined delay of the respective tap coupled to said converged adaptive filter.

2. The acoustic signal delay measurement apparatus of claim 1, wherein said processor is further arranged to adjust the delay of each of said plurality of taps to equal the delay of said tap coupled with said converged adaptive filter.

3. The acoustic signal delay measurement apparatus of claim 1, wherein said processor is further arranged to set said plurality of coefficients of each of said plurality of adaptive filters to equal said plurality of coefficients of said converged adaptive filter.

4. The acoustic signal delay measurement apparatus of claim 1, wherein said processor is further arranged, responsive to a predetermined smoothing filter, to filter said plurality of coefficients of said converged adaptive filter, said peak value being identified from said filtered coefficients.

5. An acoustic signal delay measurement method, the method comprising:

providing an input signal at a signal input terminal;

outputting said provided input signal at a signal output terminal;

receiving an acoustic echo of said output signal at an echo input terminal;

applying a plurality of different predetermined delays to said provided input signal;

for each of said applied delays, provide said delayed input signal to a first input of a respective adaptive filter exhibiting a plurality of coefficients, a second input of the respective adaptive filter receiving the acoustic echo of said output signal;

determining an amount of time until achieving a peak value by one of the plurality of coefficients of one of the plurality of adaptive filters which has converged;

determining the predetermined delay applied to the input signal at the first input of the converged adaptive filter; and calculating a system delay by adding the amount of time until achieving a peak value to the predetermined delay.

6. The method of claim 5, further comprising adjusting the delay at the first input of each of the plurality of adaptive filters to equal the delay at the first input of the converged adaptive filter.

7. The method of claim 5, further comprising setting the plurality of coefficients of each of the plurality of adaptive filters to equal the plurality of coefficients of the converged adaptive filter.

8. The method of claim 5, further comprising filtering the plurality of coefficients of the converged adaptive filter, the peak value being identified from said filtered coefficients.

9. An acoustic delay cancellation apparatus comprising:

a signal input terminal;

a signal output terminal;

at least one echo input terminal;

an adjustable tapped delay line exhibiting a plurality of taps, a first end of said adjustable tapped delay line coupled to said signal input terminal, each of said taps exhibiting a respective predetermined delay in relation to the first end of said adjustable tapped delay line;

a processor, an output of said processor coupled to a control input of said adjustable tapped delay line; and a plurality of adaptive filters, a first input of each of said plurality of adaptive filters coupled to a respective one of said at least one echo input terminal, a second input of each of said plurality of adaptive filters coupled to a respective one of said plurality of taps and an output of each of said plurality of adaptive filters coupled to a respective input of said processor, wherein each of said plurality of adaptive filters exhibits a plurality of coefficients, and wherein said processor is arranged to:

adjust the delay of each of said plurality of taps to equal the delay of said tap coupled with one of said plurality of adaptive filters which has converged; and set said plurality of coefficients of each of said plurality of adaptive filters to equal said plurality of coefficients of said converged adaptive filter.

* * * * *